W. F. CONVERSE.
Car Spring.
No. 49,086.
Patented Aug. 1, 1865.
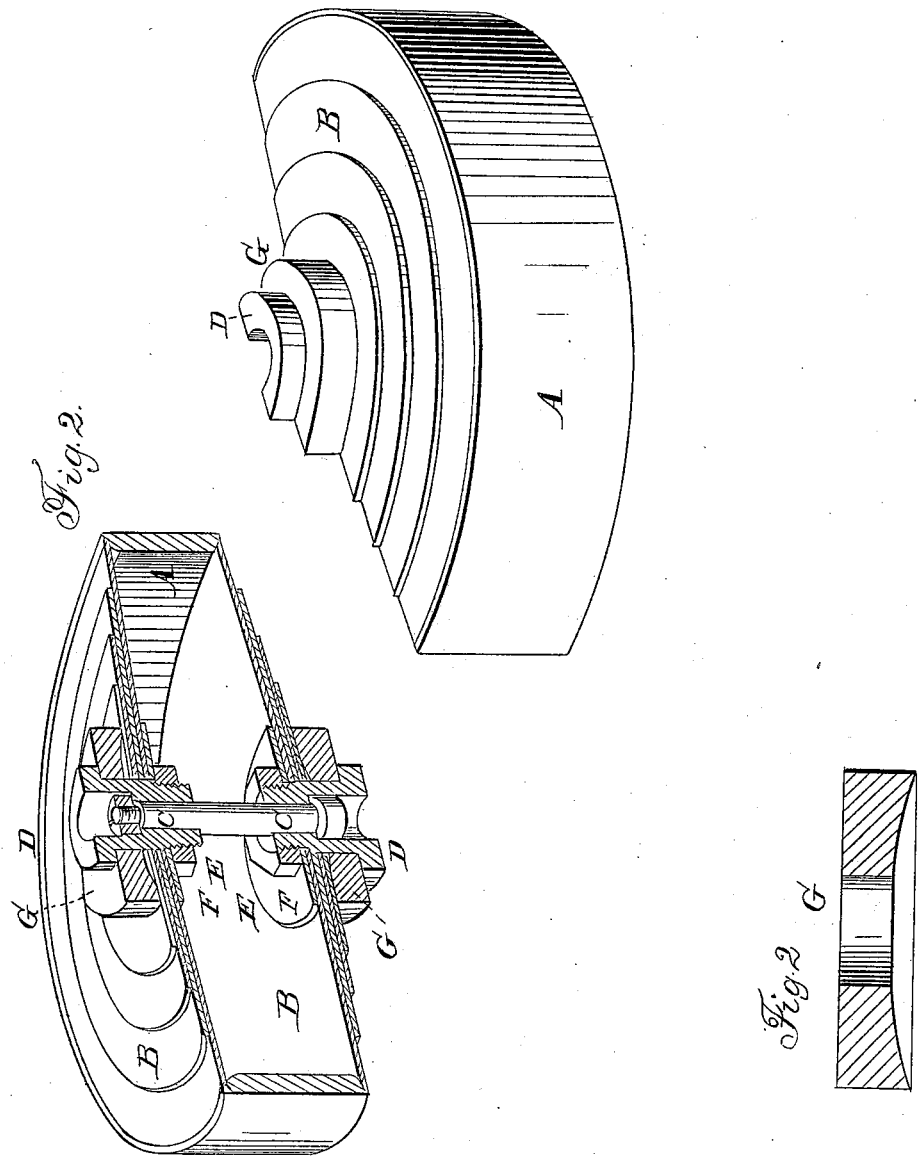
Witnesses:
C. L. Fishes
James H. Layman.
Inventor:
W. F. Converse
By Knight Bros
Attys

UNITED STATES PATENT OFFICE.

WM. F. CONVERSE, OF HARRISON, OHIO.

IMPROVEMENT IN RAILROAD-CAR SPRINGS.

Specification forming part of Letters Patent No. 49,086, dated August 1, 1865.

*To all whom it may concern:*

Be it known that I, WILLIAM F. CONVERSE, of Harrison, Hamilton county, Ohio, have invented a new and useful Improvement in Car-Springs; and I do hereby declare the following to be a full, clear, and exact description thereof, reference being had to the accompanying drawings, making a part of this specification.

My invention relates to the class of railroad-car springs described in my patent of November 8, 1859, and is designed to render such springs more durable and effective.

Figure 1 represents, by an axially-divided perspective view, a spring embodying my improvement. Fig. 2 is an axial section of my sleeve or collet on an enlarged scale.

The ring A and bundles or series of unequal disks B and B' may be essentially the same as the corresponding parts in my patent aforesaid.

My hub C D E F G differs from that described in my patent aforesaid in several material particulars, to wit: The head D of the screw C D is made cylindrical to fit and occupy a corresponding socket in the bolster of the car, and is placed outside of the bundle of disks, the nut E being placed inside thereof. Moreover, the stem C of my screw C D is longer, to afford room for a washer, F, and for a gland, collet, or deflector, G, which is interposed between the head D and the outside disk. The collet G is cylindrical both internally and externally, and is of sufficient vertical thickness to secure perfect rigidity and to separate the bolster from the ring a distance equal to half the intended play of the spring. The outer end of the collet G is made accurately square to fit the correspondingly square shoulder of the head D of the screw. The inner end of my collet G is made dishing or countersunk to enable the set of the spring to be taken up after a brief period of active use. The set having been thus taken up, the disks assume a flat or slightly-convex form when in place in the car, and retain the same thereafter without alteration.

A number of springs of unequal flexibility may be all brought to an exact uniform standard by applying collets of slightly larger diameters to the most flexible springs and collets of slightly smaller diameter to those of greater tension. The collets and rings may be composed of cast-iron. The head of the bolt and the collet are placed outside and the nut and washer are placed inside to insure a perfectly square and equal bearing of the head of the bolt upon the collet and of the latter upon the outer disk, and to avoid the irregular bearing incident to a nut, it being nearly impossible to cut a screw-thread so true as to bring the bearing-surface or sole of the nut perfectly square with its axis.

By the provision of the separate and rigid collet of diameter not less than one-third that of the largest disk and of thickness equal to half the play of the spring, and having its outer end square with its axis and its inner end dishing, I secure any desired play and tension or flexibility of the spring, and enable the spring to be restored to its proper and permanent form after it has taken its first set.

I claim herein as new and of my invention—

The collet G, in the described combination with a centrally-clamped disk-spring.

In testimony of which invention I hereunto set my hand.

WM. F. CONVERSE.

Witnesses:
GEO. H. KNIGHT,
JAMES H. LAYMAN.